(12) United States Patent
Lei

(10) Patent No.: US 7,656,513 B2
(45) Date of Patent: Feb. 2, 2010

(54) SYSTEM FOR CHECKING CENTRATION OF LENS SURFACES OF ASPHERIC LENS

(75) Inventor: Bin Lei, Foshan (CN)

(73) Assignees: Premier Image Technology(China) Ltd., Foshan, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 44 days.

(21) Appl. No.: 12/002,164

(22) Filed: Dec. 14, 2007

(65) Prior Publication Data

US 2008/0316470 A1 Dec. 25, 2008

(30) Foreign Application Priority Data

Jun. 25, 2007 (CN) .................. 2007 1 0200874

(51) Int. Cl.
G01B 9/00 (2006.01)
G01M 11/00 (2006.01)
(52) U.S. Cl. .................. 356/127; 356/124; 356/125
(58) Field of Classification Search .......... 356/121–137
See application file for complete search history.

(56) References Cited

U.S. PATENT DOCUMENTS

| | | | | |
|---|---|---|---|---|
| 3,877,788 | A * | 4/1975 | Sprague et al. | 356/124 |
| 4,275,964 | A * | 6/1981 | Vassiliadis | 356/125 |
| 4,537,473 | A * | 8/1985 | Maschmeyer | 356/513 |
| 4,779,979 | A * | 10/1988 | Iwane | 356/125 |
| 5,317,452 | A * | 5/1994 | Prentiss et al. | 359/819 |
| 5,548,396 | A * | 8/1996 | Morita et al. | 356/127 |
| 5,742,381 | A * | 4/1998 | Ueno | 356/124 |
| 5,844,670 | A * | 12/1998 | Morita et al. | 356/124 |
| 5,940,181 | A * | 8/1999 | Tsubono et al. | 356/508 |
| 7,046,351 | B2 * | 5/2006 | Ito | 356/127 |
| 7,286,212 | B2 * | 10/2007 | Namiki | 356/127 |
| 7,384,144 | B2 * | 6/2008 | Ross-Messemer et al. | 351/204 |
| 2002/0001262 | A1 | 1/2002 | Iwazawa et al. | |
| 2003/0002048 | A1 * | 1/2003 | Zanoni | 356/512 |

FOREIGN PATENT DOCUMENTS

CN 1621798 A 6/2005

OTHER PUBLICATIONS

Yi-Jie Liu, Yu-Chi Lin, Yin-Guo Huang, Mei-Rong Zhao, Xin Zhou,"Study on Measurement System of Centering Errors", Electronic Measurement Technology, Dec. 2005, pp. 5 to 6, 2005(5),1977-2009 Electronic Measurement Technology Publishing House, China.

* cited by examiner

*Primary Examiner*—Gregory J Toatley, Jr.
*Assistant Examiner*—Jarreas C Underwood
(74) *Attorney, Agent, or Firm*—Zhigang Ma

(57) ABSTRACT

A system for checking centration of lens surfaces of an aspheric lens includes a light-emitting device, a lens holder and an image processing device. The light-emitting device emits a light. The lens holder positions the aspheric lens in a light path of the light emitted from the light-emitting device. The image processing device receives the light which is emitted from the light-emitting device and has passed through the aspheric lens, and produces an image and shows the image. A quality of the image shown by the image processing device determines a tilt degree of the aspheric lens.

6 Claims, 5 Drawing Sheets

SYSTEM FOR CHECKING CENTRATION OF LENS SURFACES OF ASPHERIC LENS

BACKGROUND

1. Field of the Invention

The present invention relates to lens technology, and particularly, to a system for checking centration of surfaces of a lens by measuring tilt thereof.

2. Description of Related Art

Nowadays, image pick-up devices (e.g., digital still cameras and camcorders) with portability and good imaging quality are popular with consumers. To ensure the portability and good imaging quality, designers use aspheric lenses with two aspheric surfaces (an aspheric surface near an object side of the lens and an aspheric surface near an image side of the lens) in these image pick-up devices.

In manufacturing process of the above aspheric lenses, tilt, an important component of centration, of the surfaces of the aspheric lenses is measured for checking quality of the lens. However, special measuring apparatus and specially trained operator are needed to measure tilt, which is difficult to use in mass production of the lenses because of low efficiency and high cost.

What is needed, therefore, is to provided a an easy system for measuring tilt of a lens.

SUMMARY

The present invention relates to a system for checking centration of lens surfaces of aspheric lens. The system includes a light-emitting device, a lens holder, and an image processing device. The light-emitting device emits light. The lens holder positions the aspheric lens in a path of the light. The image processing device receives the light which is emitted from the light-emitting device and has passed through the aspheric lens, and produces an image and shows the image. A quality of the image shown by the image processing device determines a tilt of the aspheric lens.

Other advantages and novel features of the present invention will become more apparent from the following detailed description of present embodiments when taken in conjunction with the accompanying drawings, in which:

DETAILED DESCRIPTION OF THE INVENTION

Reference will now be made to the figures to describe the at least one present embodiment in detail.

Figure 1:
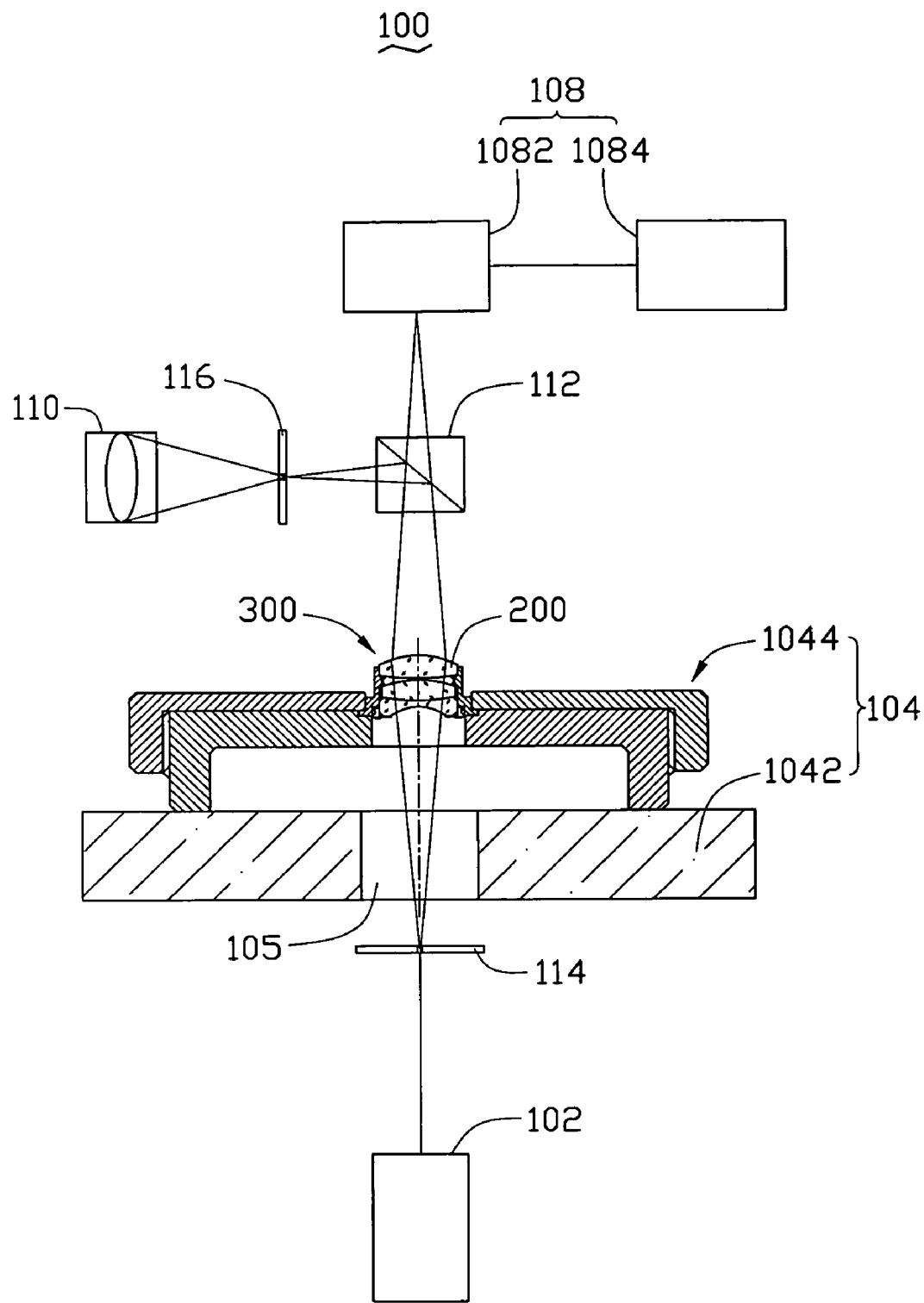
FIG. 1 is a schematic view of a system for checking centration of lens surfaces in accordance with a present embodiment.

Referring to FIG. 1, a system 100 for checking centration of lens surfaces, in accordance with a present embodiment, is shown. The lens surfaces are aspheric surfaces of a lens 200. The system 100 includes a light-emitting device 102, a lens holder 104, an image processing device 108, an observing device 110, a light splitter 112, and an aperture device 114. The aspheric lens 200 includes two aspheric surfaces (an aspheric surface near an object side and an aspheric surface near an image side). The lens 200 is one lens of an optical imaging system 300, which is positioned at the image side of the optical imaging system 300.

The light-emitting device 102 is a laser-emitting device or a natural-light-emitting device. If the light-emitting device 102 is a laser-emitting device, the laser-emitting device can be a gas-laser device or a solid-laser device. In this present embodiment, beneficially, the light-emitting device 102 is a gas-laser device, such as a helium-neon laser device. The laser-emitting device emits laser light towards the lens 200 via an aperture (not labeled) of the aperture device 114. Preferably, a diameter of the aperture is 0.1 microns.

The lens holder 104 includes a moving portion 1042 and a clamp 1044 fixed on the moving portion 1042. A through hole 1050 is defined in a central part of the moving portion 1042 on the light path of the light-emitting device 102. The clamp 1044 fixedly holds the optical imaging system 300 with the lens 200. The moving portion 1042 is configured for moving the optical imaging system 300 into the light path of the light-emitting device 102, and causing it to focus on the aperture device 114.

Figure 2:
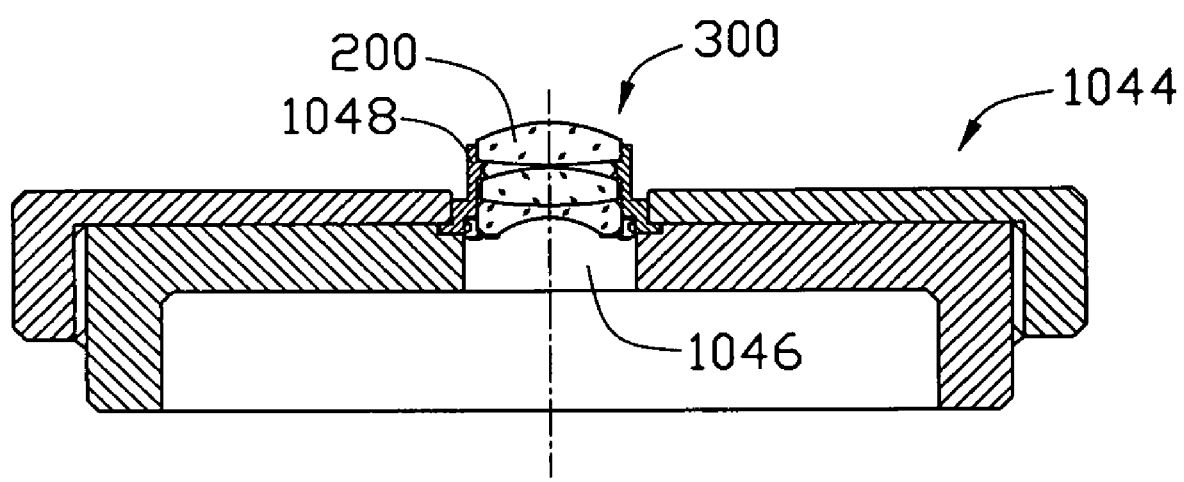
FIG. 2 is an enlarged, cross-sectional view of a clamp of FIG. 1.

Referring to FIG. 2, a positioning hole 1046 is defined in the clamp 1044. A lens sub-holder 1048 is received in the positioning hole 1046 of the clamp 1044. The lens sub-holder 1048 is separated from the clamp 1044. Alternatively, the lens sub-holder 1048 is integrated with the clamp 1044. The optical imaging system 300 is engagingly received in the lens sub-holder 1048 so as to be secured horizontally and vertically in the clamp 1044. The moving portion 1042 is driven by a motor.

The light splitter 112 is positioned in the light path of the light-emitting device 102 between the optical imaging system 300 and the image processing device 108. The observing device 110 is positioned in the reflected light path of the light splitter 112. Further, an aperture device 116 is positioned in the reflected light path of the light splitter 112 between the light splitter 112 and the observing device 110. Operator decides whether the optical imaging system 300 is aligned with the light-emitting device 102 via the observing device 110 (e.g., an lens module) and the aperture device 116 before laser is emitted (e.g., operator can decide this with help of natural light or light emitted from light source). If not, the lens holder 104 is moved so as to make the optical imaging system 300 aligned with the light-emitting device 102.

The image processing device 108 includes an image sensor 1082 and a display 1084 electrically connected to the image sensor 1082. The image sensor 1082 is generally a CCD (charge-coupled device) or a CMOS (Complementary Metal-Oxide-Semiconductor). The image sensor 1082 is positioned in an image focal plane of the optical imaging system 300. The display 1084 is a liquid crystal display, a CRT (cathode-ray tube) display or the like. The image sensor 1082 receives light from the optical imaging system 300 to produce an image, and the display 1084 shows the image.

Figure 3:
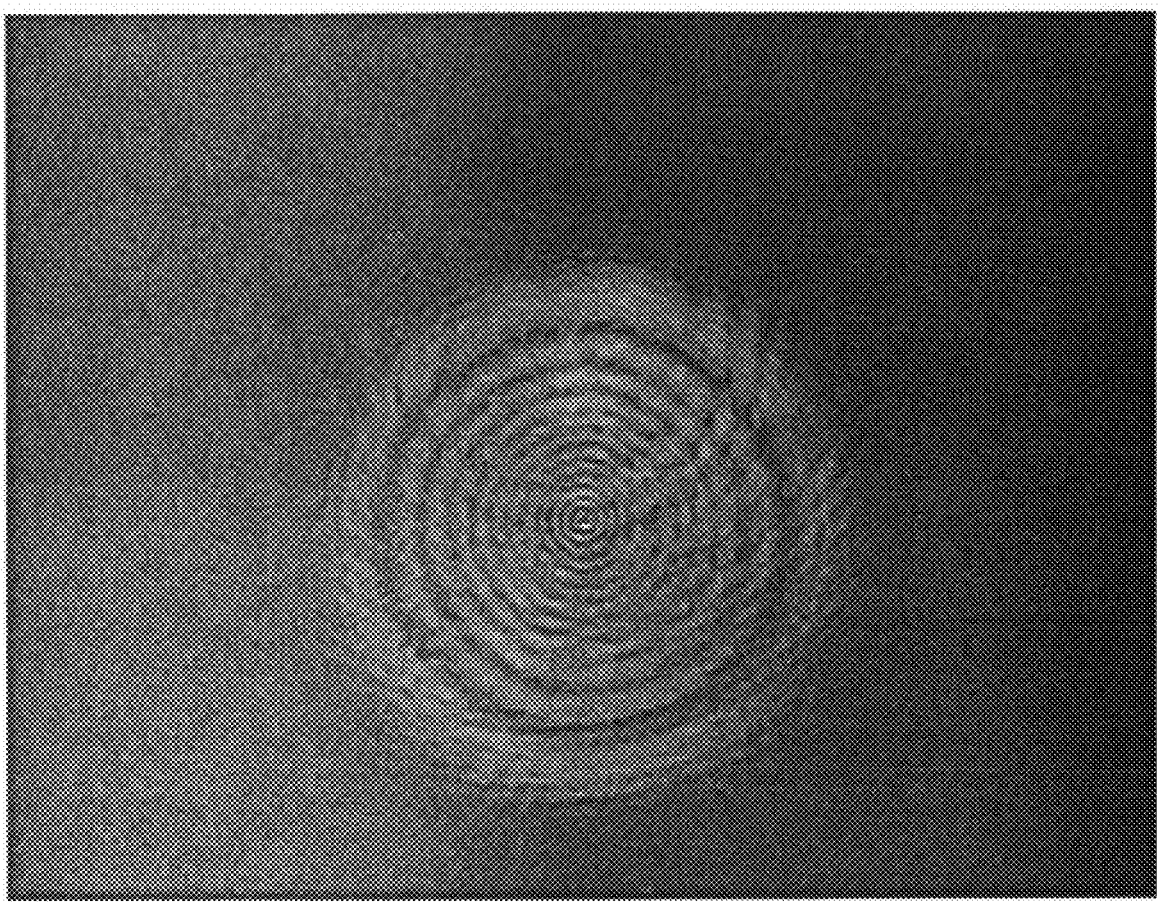
FIG. 3 is a first image produced by the system of FIG. 1.
Figure 4:
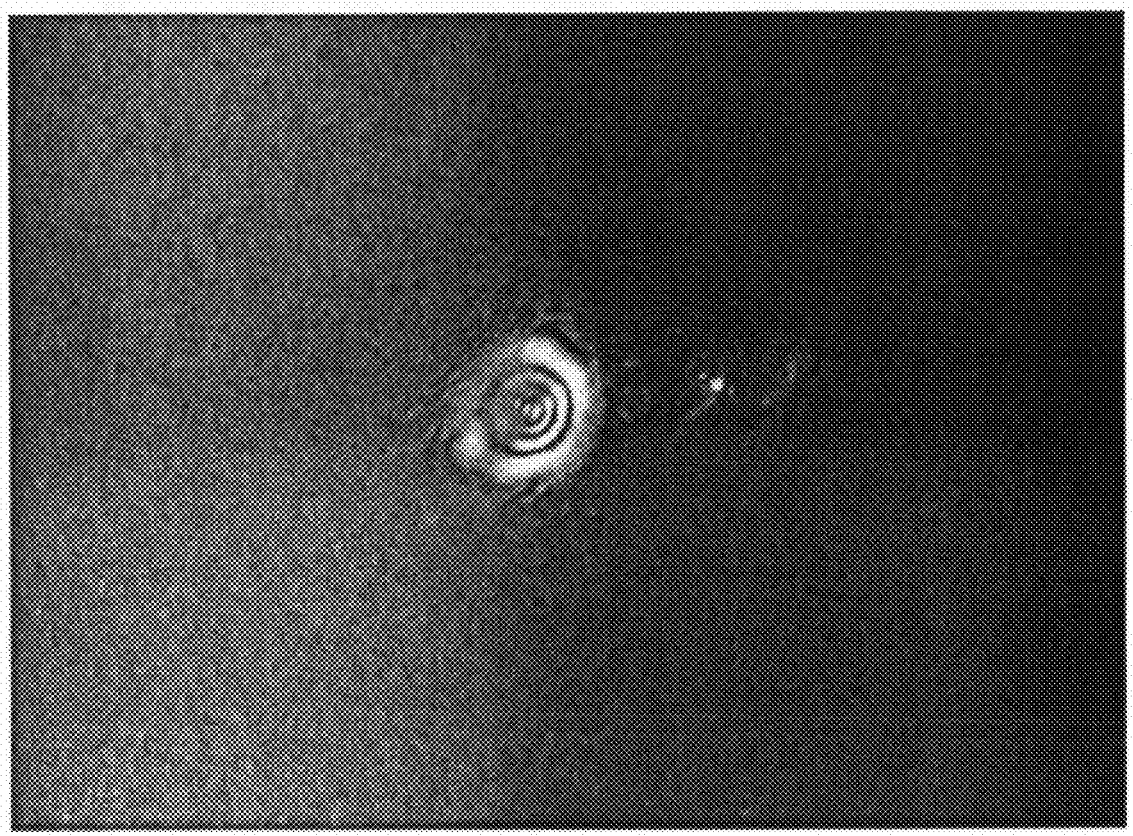
FIG. 4 is a second image produced by the system of FIG. 1.
Figure 5:
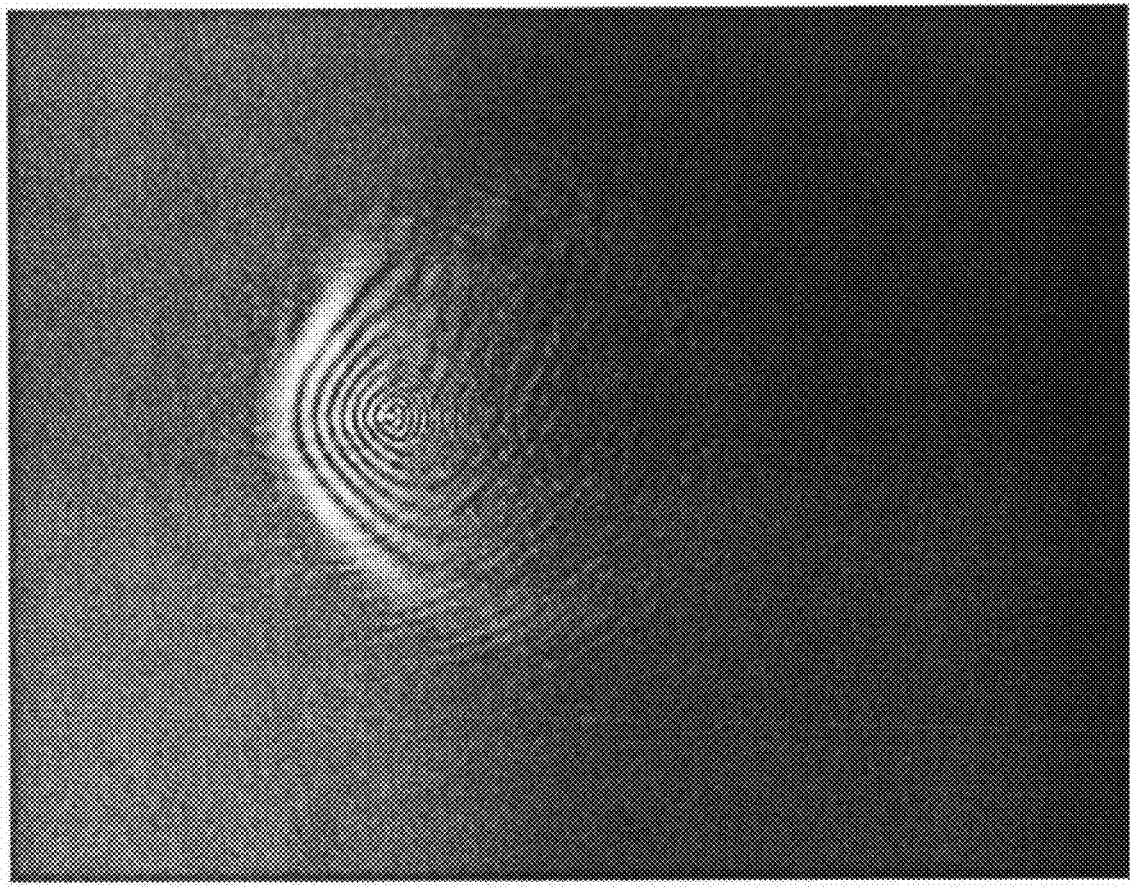
FIG. 5 is a third image produced by the system of FIG. 1.

Referring to FIGS. 3, 4 and 5, the operator estimates a tilt degree of the lens 200 according to the image shown on the display 1084. The tilt degree is proportional to an angle of a wedge formed by the intersection of the optical axis of the aspheric lens 200 and the mechanical axis of the aspheric lens 200 when tilt is present. The greater the tilt degree, the worse the quality of the aspheric lens 200. If the image shown on the display is: (1) a clear image of concentric-circles, as shown in FIG. 3, the could be assigned a tilt degree of the lens 200 of A for example; (2) a vague concentric-circles image with slight flare spots, as shown in FIG. 4, the tilt degree of the lens 200 could be B; (3) a non-concentric-circles image, such as a goldfish-eye-shaped image, as shown in FIG. 5, the tilt degree of the lens 200 could be C. Then according to pre-determined quality standards lenses may be assorted by quality, possibly discarding the C's or even the B's.

Since the quality of the aspheric lens 200 is directly reflected by the image shown on the display 1084 of the image processing device 108, operator can easily decide whether the aspheric lens 200 is of good quality or not, and operation is easy.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A system for checking centration of opposite lens surfaces of an aspheric lens in a lens module, the system comprising:
    a light-emitting device for emitting light;
    a lens holder for positioning the aspheric lens in a light path of the light emitted from the light-emitting device;
    an image processing device for receiving the light which is emitted from the light-emitting device and has passed through the aspheric lens, producing an image and showing the image, wherein a quality of the image shown by the image processing device determines a tilt degree of the aspheric lens.

2. The system as claimed in claim 1, wherein the light-emitting device is a laser-emitting device.

3. The system as claimed in claim 1, wherein the lens holder comprises a moving portion and a clamp fixed on the moving portion; the clamp fixedly holds the aspheric lens, and the moving portion is configured for moving the clamp into light path of the light-emitting device.

4. The system as claimed in claim 1, wherein the image processing device comprises an image sensor and a display electrically connected to the image sensor; the image sensor is configured for receiving light through the aspheric lens, and the display is configured for showing the image.

5. The system as claimed in claim 1, wherein the image includes concentric-circles or non-concentric-circles.

6. The system as claimed in claim 3, further comprising a splitter and an observing device; the splitter being positioned into light path of the light-emitting device between the aspheric lens and the image processing device; the observing device being positioned into reflected light path of the splitter.

* * * * *